United States Patent
Picart et al.

(10) Patent No.: US 9,330,795 B2
(45) Date of Patent: May 3, 2016

(54) METHOD FOR PREPARING A MIXED FUEL COMPRISING URANIUM AND AT LEAST ONE ACTINIDE AND/OR LANTHANIDE APPLYING A CATION EXCHANGE RESIN

(75) Inventors: Sebastien Picart, Villeneuve les Avignon (FR); Hamid Mokhtari, Pitres (FR); Isabelle Jobelin, Aubignan (FR)

(73) Assignee: COMMISSARIAT A L'ENERGIE ATOMIQUE ET AUX ENERGIES (FR)

( * ) Notice: Subject to any disclaimer, the term of this patent is extended or adjusted under 35 U.S.C. 154(b) by 140 days.

(21) Appl. No.: 12/998,151

(22) PCT Filed: Sep. 22, 2009

(86) PCT No.: PCT/EP2009/062267
§ 371 (c)(1),
(2), (4) Date: Mar. 22, 2011

(87) PCT Pub. No.: WO2010/034716
PCT Pub. Date: Apr. 1, 2010

(65) Prior Publication Data
US 2011/0169178 A1    Jul. 14, 2011

(30) Foreign Application Priority Data
Sep. 23, 2008    (FR) ...................................... 08 56388

(51) Int. Cl.
*G21C 21/00*    (2006.01)
*G21C 3/62*    (2006.01)

(52) U.S. Cl.
CPC    *G21C 3/62* (2013.01); *G21C 3/623* (2013.01); *Y02E 30/38* (2013.01)

(58) Field of Classification Search
CPC .......... G21C 3/62; G21C 3/623; Y02E 30/38; C22B 60/0239
USPC ........................................................ 264/0.5
See application file for complete search history.

(56) References Cited

U.S. PATENT DOCUMENTS

| 3,188,169 | A | * | 6/1965 | Kraus et al. ........................ 423/7 |
| 3,531,416 | A | * | 9/1970 | Akutsu et al. .................. 252/637 |
| 3,800,023 | A | * | 3/1974 | Haas .................................. 423/7 |
| 3,880,769 | A | * | 4/1975 | Googin et al. ................ 252/636 |
| 3,995,009 | A | * | 11/1976 | Notz ................................. 423/7 |
| 4,010,287 | A | * | 3/1977 | Beatty .............................. 427/6 |
| 4,036,920 | A |  | 7/1977 | Chihiro et al. |

(Continued)

FOREIGN PATENT DOCUMENTS

DE    P 25 27 095.5    1/1976
GB    1466529          3/1977

*Primary Examiner* — Alison L Hindenlang
*Assistant Examiner* — Kimberly A Stewart
(74) *Attorney, Agent, or Firm* — Baker Hostetler LLP

(57) ABSTRACT

The invention relates to a method for preparing a fuel based on oxide, carbide, and/or oxycarbide comprising uranium and at least one actinide and/or lanthanide component, comprising the following steps:
- a step for preparing a load solution consisting in a nitric solution comprising said actinide and/or lanthanide in the form of actinide and/or lanthanide nitrates and uranium as a hydroxylated uranyl nitrate complex;
- a step for passing said solution over a cation exchange resin comprising carboxylic groups, with which the actinide and/or the lanthanide in cationic form and the uranium as uranyl remain bound to the resin;
- a heat treatment step of said resin so as to obtain said fuel.

12 Claims, 4 Drawing Sheets

(56) References Cited

U.S. PATENT DOCUMENTS

| | | | |
|---|---|---|---|
| 4,070,438 A * | 1/1978 | Notz et al. | 423/7 |
| 4,131,527 A * | 12/1978 | Friedman et al. | 204/157.4 |
| 4,439,279 A * | 3/1984 | Herrmann et al. | 205/44 |
| 5,585,043 A * | 12/1996 | Wada et al. | 252/636 |
| 2005/0288542 A1 * | 12/2005 | Grandjean et al. | 588/313 |
| 2007/0178036 A1 * | 8/2007 | Takahashi | 423/253 |
| 2007/0275450 A1 * | 11/2007 | Roberts et al. | 435/243 |

* cited by examiner a b c d

METHOD FOR PREPARING A MIXED FUEL COMPRISING URANIUM AND AT LEAST ONE ACTINIDE AND/OR LANTHANIDE APPLYING A CATION EXCHANGE RESIN

TECHNICAL FIELD

The invention relates to a method for preparing a mixed fuel, i.e. comprising both uranium and at least one actinide, in particular a minor actinide and/or a lanthanide, applying a cation exchange resin.

This method find its application in the design of novel nuclear fuels which may be used for making up nuclear pencils intended for many types of nuclear reactors or in order to form transmutation targets, with view to carrying out nuclear transmutation experiments notably for recycling long-life elements such as minor actinides.

STATE OF THE PRIOR ART

Generally, a nuclear fuel used in the core of a nuclear reactor has the role of providing energy in the form of heat by fission of radionuclides, in particular uranium, plutonium, thorium, following neutron bombardment.

Among fuels developed during previous years, mention may be made of:
- simple fuels, i.e. comprising a single radioactive element, for example simple oxides, such as $UO_2$;
- mixed fuels, i.e. comprising at least two radioactive elements, such as mixed oxides based on uranium and thorium or further mixed oxides of the MOX type based on uranium and plutonium.

Simple fuels of the $UO_2$ type are conventionally obtained by a method comprising the following steps:
- a step for extracting ores comprising uranium in the metal state;
- a step for crushing and milling the extracted ores followed by a step for dissolving the ore, via an alkaline or acid route, in order to extract uranium therefrom;
- a step for concentrating the obtained solution, so as to produce a yellow powder, a so-called "yellow cake", which contains about 75% of uranium oxide;
- a step for converting the uranium oxide into uranium tetrafluoride $UF_4$ and then into uranium hexafluoride $UF_6$;
- a step for enriching uranium hexafluoride in uranium 235;
- a conversion of the enriched uranium hexafluoride into uranium oxide powder; and
- a step for compressing the obtained powder, in order to form pellets followed by a sintering step for consolidating them.

Fission of uranium generates a certain number of long-life radionuclides, such as plutonium and minor actinides, such as americium and curium. The first is recycled as a fissile material, the second ones are intended to be transmuted into short-life radionuclides.

In order to add value to plutonium, a novel fuel was developed, which incorporates plutonium oxide to uranium oxide, this novel fuel being called MOX fuel.

More specifically, this fuel of the MOX type comprises both uranium oxide and plutonium oxide, plutonium having been created by uranium 238 neutron capture in nuclear reactors and therefore stemming from reprocessing of irradiated fuels, while this time uranium is of natural origin.

MOX fuel is conventionally obtained via two routes:
- a first route which may be described as <<direct co-milling>>, in which $UO_2$ powder and $PuO_2$ powder are mixed and co-milled straightaway in the intended proportions in order to obtain the specified plutonium content, i.e. the plutonium content which the fuel has at the end of manufacturing;
- a second route which combines both milling and dilution steps, in which a primary powder mixture <<overconcentrated>> in plutonium relatively to the specified plutonium content is initially formed, which is then secondarily diluted by adding uranium dioxide.

With respect to the two types of fuels mentioned above and to their conventional preparation routes, it may be observed that they are both based on powder metallurgy, which may generate handling problems in a confined radioactive medium.

Thus, the inventors therefore set their goal to propose a method for preparing a mixed fuel comprising, in addition to uranium, other actinide and/or lanthanide elements, in particular minor actinides such as americium, curium and neptunium, notably applying mixing steps via a liquid route.

Notably when the elements to be incorporated are minor actinides, this would allow direct use of liquid effluents comprising said actinides within the scope of the method and notably avoid the handling of powders of these elements.

DISCUSSION OF THE INVENTION

Thus, the invention according to a first object relates to a method for preparing a fuel based on oxide, carbide and/or oxycarbide comprising uranium and at least one actinide and/or lanthanide element, comprising the follow steps:
- a step for preparing a load solution consisting in a nitric solution comprising said actinide and/or lanthanide in the form of actinide and/or lanthanide nitrates and the uranium in the form of a hydroxylated uranyl nitrate complex;
- a step for passing said solution over a cation exchange resin comprising carboxylic groups, with which the actinide and/or the lanthanide in cationic form and the uranium in the uranyl form remain bound to the resin;
- a step for the heat treatment of said resin in order to obtain said fuel.

Thus, the method of the invention is a method which does not involve the powder metallurgy technique for associating uranium with at least one actinide and/or lanthanide element and the drawbacks resulting therefrom, but uses the capacity of a cation exchange resin comprising carboxylic groups for binding both uranyl cations and cations based on an actinide and/or lanthanide element, the binding being accomplished by exchange between the protons borne by the carboxylic groups and the uranyl cations and the actinide and/or lanthanide cations contained in the load solution.

The inventors were able to notice surprisingly that the aforementioned resins have the capacity of binding in a grouped and congruent way, uranyl cations and actinide and/or lanthanide cations, provided that the condition that the uranyl nitrate complex should be hydroxylated, is observed. The proportion between the uranyl cations and those from the actinide and/or lanthanide element of the load solution is again found in the resin after passage of said solution, because of the absence of selectivity of the latter. It is thus possible by preparing the load solution to provide the proportions of elements which will again be found in the fuel at the end of the method.

This method also has the advantage of not involving ammonium ions, the handling of which may be delicate in a nuclear environment. The operation for recycling the eluates is thereby facilitated.

This method applies to the preparation of fuels, further comprising uranium, actinides in the oxidation states (III), (V) and (VI) as well as lanthanides in the oxidation state (III).

Most particularly, the method of the invention may be applied to the preparation of fuels, comprising in addition to uranium, at least one minor actinide such as americium, curium and/or neptunium and mixtures thereof. In this scenario, the minor actinides may originate from a hydrometallurgical reprocessing flow of used fuel.

Still more particularly, the method of the invention may be applied to the preparation of fuels comprising in addition to uranium, americium(III) or neodymium(III).

It is understood that when the fuels prepared according to the method of the invention are intended to be used in nuclear reactors in order to produce energy, the proportion of the actinide and/or lanthanide elements other than uranium will be determined so as not to be detrimental to the properties of the fissile uranium element.

The first step of the method consists of preparing a load solution intended to be passed over a cation exchange resin comprising carboxylic groups.

This load solution may be prepared in the following way:
preparation of a first nitric solution comprising nitrate of said actinide and/or lanthanide element, for example a solution of neodymium(III) or americium(III) nitrate;
introduction of a predetermined amount of uranium oxide $UO_3$ or optionally $U_3O_8$, in said first solution, said amount being set so as to form a hydroxylated uranyl nitrate complex of formula $UO_2(NO_3)_{2-x}(OH)_x$ with for example a 25% hydrolyzed uranyl nitrate complex of formula $UO_2(NO_3)_{1.5}(OH)_{0.5}$;
a step for mixing the resulting solution preferably at room temperature, optionally followed by a filtration step.

According to an alternative, the load solution may be prepared by introducing a predetermined amount of uranium trioxide into a first solution comprising nitrate of said actinide and/or lanthanide element, already uranyl nitrate or nitric acid, so as to obtain the desired amount of uranium and a hydroxylated uranyl nitrate complex of formula $UO_2(NO_3)_{2-x}(OH)_x$ with $x \leq 1$.

It is important that the uranyl cation be again found as a hydroxylated uranyl nitrate complex, since it was shown by the inventors that the presence of this complex forms the engine for the exchange between the resin and the cations present in the load solution. The presence of this complex in the load solution notably gives the possibility of causing concomitant ion exchange of the uranyl cations and of the actinide and/or lanthanide cations with the protons of the cation exchanger resin, when the load solution passes over the latter.

This predetermined amount of uranium trioxide to be introduced into the first solution is set so that the molar ratio between the number of moles of nitrate ions and the number of moles of uranium is less than 2.

As an example, for a 25% hydrolyzed uranyl nitrate complex of formula $UO_2(NO_3)_{1.5}(OH)_{0.5}$, the equation for forming this complex may be the following:

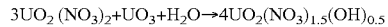

$$3UO_2(NO_3)_2 + UO_3 + H_2O \rightarrow 4UO_2(NO_3)_{1.5}(OH)_{0.5}$$

As an example, in order to obtain such a complex, starting with a solution of americium nitrate contain a moles of nitric acid, (a/R) moles of uranium oxide may be dissolved, R being the number of moles of nitrates assigned to the uranium (i.e. 1.5 here).

The following step then consists of having the load solution pass over a cation exchange resin comprising carboxylic groups, so as to allow the binding of the uranyl cations and of the actinide and/or lanthanide cations.

The resins used conventionally appear as polymeric pearls integrating exchangeable groups, in our case, carboxylate groups bearing protons H. The resins used within the scope of the invention may be resins resulting from (co)polymerization of (meth)acrylic acid or acrylonitrile with a cross-linking agent, notably divinylbenzene (DVB).

In the case of acrylonitrile, a step for hydrolysis of the —CN groups into carboxylic groups has to be provided after polymerization.

Commercial resins which may be used for applying the method of the invention, may be resins provided by Rohm & Haas, such as IMAC HP 333 resins.

The selected cation exchange resin may be caused to undergo one or more processing steps before the passing of the load solution, among which mention may be made of:
a wet calibration step so as to isolate the desired grain size fraction, for example a fraction ranging from 600 to 800 µm;
at least one washing step applying a basic and acid treatment cycle with ammonia and nitric acid followed by a rinsing step with demineralized water;
a drying step after the rinsing step;
a shape-sorting step so as to remove broken or non-spherical particles, this step may be carried out on a tilted table.

It is specified that the aforementioned washing step has the purpose of cleaning the resin and ridding it of any presence of synthesis residues. Thus, binding an ammonium group by a reaction for neutralizing the protons of the carboxylic groups, makes it possible to cause swelling of the resin promoting better access to the pores of the washing water. The passing of nitric acid then allows the ammonium groups to be replaced with protons $H^+$ in order to restore the carboxylic groups.

The resin, possibly treated if need be, is then advantageously humidified generously and placed in a column in order to form a bed of resin particles intended to receive the load solution.

The step for passing the load solution over the resin conventionally consists of letting it flow, by percolation, through the bed and of recovering an eluate at the outlet of the bed. During this passage, the resin comprising carboxylic groups gradually exchanges its protons for uranyl cations and cations of the actinide and/or lanthanide element. The pH of the eluate suddenly decreases, when the exchange begins with the resin in proton form (i.e. comprising carboxylic groups —COOH). It then increases again until the value of the pH of the input load is found again, which means that the exchange is finished and that the resin is saturated with metal cations. It is thereby possible to stop the passing of the load solution over the resin. In other words, it is proceeded with passing the load solution over the resin until an eluate is obtained having a concentration identical with the one of the load solution.

The recovered eluate during the method may be caused to undergo a recycling step, for example by adjusting the acidity of this eluate by adding nitric acid, by optionally dissolving uranium oxide into the solution and by completing with a solution of actinide and/or lanthanide nitrate if need be, so as to form a new load solution intended to be passed over the resin.

After the passing step, the method of the invention may comprise a step for washing the resin with demineralized water, notably with view to driving out the load remaining in the pores of the resin.

The method may comprise a step for drying the resin at a temperature around 100° C., for example at 105° C., so as to cause evaporation of the water present in the pores of the resin.

According to the invention, the complexed resin is then caused to undergo a heat treatment at an effective temperature for forming an oxide, a carbide and/or an oxycarbide comprising uranium and at least one actinide and/or lanthanide element.

This treatment conventionally comprises a carbonization step intended to remove the organic backbone of the resin, this carbonization step may take place at a temperature which may range up to 1,000° C., this step may be performed in air if the intention is to totally remove the carbon or under an inert atmosphere if the intention is to keep part of the carbon. This carbonization is conventionally carried out in a tubular furnace. At the end of this step, the fuel conventionally appears as an oxide or as an intimate mixture of metal oxide and of carbon.

After the carbonization step, a reduction step may follow (which may be described as a carbothermal reduction) so as to transform, if necessary, the oxide portion mixed with carbon obtained at the end of the carbonization step under an inert atmosphere into carbide and/or oxycarbide.

This reduction step may be performed in two ways:
- either by heating beyond the carbonization temperature, for example at a temperature ranging from 1,600 to 1,800° C., with which evolvement of carbon monoxide is obtained, this carbon monoxide reducing the oxide into carbide and being advantageously removed by sweeping with an inert gas;
- or by heating the material obtained by carbonization under an inert gas in a reducing, for example hydrogen, atmosphere.

The obtained fuel generally appears as microspheres, which may be shaped under the suitable format depending on the contemplated applications.

The invention according to a second object also relates to a fuel which may be obtained by the method of the invention.

This fuel may be intended to be used in nuclear reactors with view to producing energy by fission of uranium. In this case, the proportion of actinide and/or lanthanide elements other than uranium is determined so as not to be detrimental to the properties of the fissile element uranium. This proportion may conventionally range up to 20 atomic % with respect to the total number of atoms of the fuel.

In addition to the fact that the fuel of the invention may be used as a fuel in reactors intended to produce heat capable of generating electricity, the fuel of the invention may also be used as transmutation targets, so as to be able to carry out transmutation experiments, with view to using in the future, this technique for the handling of minor actinides notably.

Other features and advantages of the invention will become better apparent upon reading the additional description which follows, which relates to examples of the manufacturing of mixed fuels comprising uranium and americium(III) (Example 1) or comprising uranium and neodymium(III) (Example 2).

Of course, the examples which follow are only given as an illustration of the object of the invention and are by no means a limitation of this object.

SHORT DESCRIPTION OF THE DRAWINGS

FIG. 1 corresponds to a graph of the thermogram type showing the trend of the mass loss P (in %) versus the applied carbonization temperature T (in ° C.) in air of the loaded resin according to Example 1.

FIG. 2 corresponds to a graph of the thermogram type showing the trend of the mass loss P (in %) versus the applied carbonization temperature T (in ° C.) under argon of the resin loaded according to Example 1.

FIG. 3 corresponds to a photograph taken with a scanning electron microscope showing the microstructure of the fuel obtained after carbonization of the resin under argon at 900° C. according to Example 1.

FIG. 4 corresponds to a graph illustrating the trend of the pH of the eluate versus the volume V (in mL) of the load solution passed over the resin (curve A) as well as the trend of the concentration C (in mol/L) in U(VI) and Nd(III) of the eluate versus the volume V of the load solution passed over the resin (curves b and c respectively) according to Example 2.

DETAILED DISCUSSION OF PARTICULAR EMBODIMENTS

EXAMPLE 1

Figure 1:
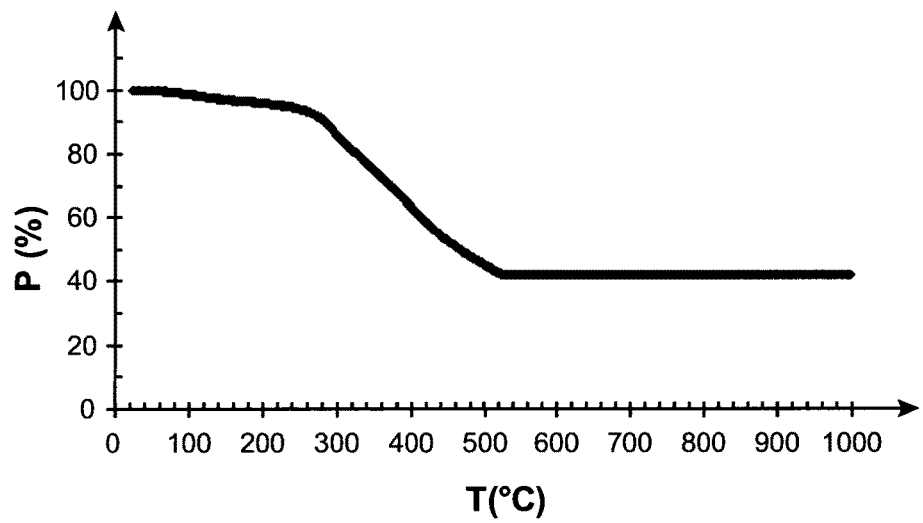

This example illustrates the preparation of a mixed oxide fuel comprising both uranium and americium(III), this preparation comprising the following steps:
- preparation of a load solution comprising hydroxylated uranyl nitrate and americium(III) nitrate;
- the passing of this load solution over a column comprising a cation exchange resin: a carboxylic resin IMAC HP333 from Rohm and Haas;
- heat treatment of the resin loaded with uranyl cations and americium(III) cations.

a) Preparation of the Load Solution

The intention is to prepare a load solution comprising hydroxylated uranyl nitrate $UO_2(NO_3)_{1.1}(OH)_{0.9}$ and americium nitrate $Am(NO_3)_3$.

In order to do this, one starts with a solution of americium nitrate with a concentration 0.011 mol/L, containing 1.22 mmol of nitric acid, the volume of the solution being 10 ml. To this solution, uranium oxide $UO_3$ is added in an amount of 1.1 mmol.

The number of uranium oxide moles $n_{UO3}$ to be added is evaluated by the following empirical formula:

$$n_{UO3} = (a/R')$$

with a corresponding to the number of moles of nitric acid contained in the starting solution and R' corresponding to the number of nitrates assigned to uranium, i.e. here 1.1, R' may be calculated, in other words, by the following formula:

$$R' = ([NO_3^-] - 3[Am^{3+}])/[UO_2^{2+}]$$

A solution is thereby obtained, comprising: $UO_2(NO_3)_{1.1}(OH)_{0.9}$ (0.11 mol/L) and $Am(NO_3)_3$ (0.011 mol/L). The final obtained pH is equal to 3.7.

b) Passing Over the Column

The selected resin is a cation exchange resin including exchangeable carboxylic groups: IMAC HP 333 made by Rohm and Haas. This resin has a volume capacity of 4 mequiv./mL and exchange kinetics comparable with macroporous resins.

The resin is sorted beforehand under wet conditions on a sieve according to three grain sizes: 400-600 μm, 600-800 μm and 800-1,000 μm. An extensive washing cycle (ammonia, nitric acid and water) is then performed on the selected section (600-800 μm), in order to remove the synthesis residues and cationic impurities still present.

The thereby resin is then dried and again sorted on a tilted table, so as to remove the broken or non-spherical particles.

Once the latter sorting has been carried out, the particles of resins are humidified again with demineralized water and then introduced into a column in order to form a bed. This is a glass column of the Bio-Rad brand with a height of 5 cm and an inner diameter of 0.5 cm. The height of the bed is about 2.5 cm.

The load solution prepared beforehand (volume: 10 mL) is then passed through the bed of resin particles at room temperature.

The carboxylic resin gradually exchanges its protons against uranyl and americium(III) cations.

The pH of the eluate suddenly decreases when the exchange begins with the resin. It then gradually increases until it again finds after equivalence, the pH value of the load solution upon entering the column. The binding occurs congruently, since the uranium/americium(III) ratio does not vary much in the eluate, the resin not exhibiting any selectivity for this pair of cations. The fact that the ratio between Am and U remains constant in the eluate during the gradual binding, provides the evidence of congruence of the exchange reaction for the Am/U pair.

From the moment when the eluate is identical with the load solution entering the column, it may be considered that the exchange is finished and that the resin is saturated with metal cations.

Next, the resin present in the column is washed with demineralized water in order to drive out the remaining load in the pores of the latter, dewatered by the passage of an air draft and then finally dried in the oven at 105° C.

In this example, the load is a 90/10 U/Am atomic mixture and the useful capacity of the resin attains 40% of the maximum exchange capacity i.e. 4 mequiv./g of dry resin. The summative equation of the ion exchange may thus be summarized as:

$$9UO_2(NO_3)_{1.1}(OH)_{0.9}+Am(NO_3)_3+21RH \rightarrow R_{21}(UO_2)_9 Am+8.1H_2O+12.9HNO_3$$

RH representing the proton exchange resin.

The metal mass content in the loaded and dried resin is 34%, distributed as 31% for uranium and 3% for americium. The formulation of this resin may approximately be written as, knowing that the pattern R has a molar mass of about 80 g/mol and includes 3 C atoms (starting with the pattern from acrylic acid):

$$R_{52}U_9AmO_{18}H_{31} \text{ or } (RH)_{31}(R_{21}(UO_2)_9Am)$$

which allows the C/(Am+U) ratio to be evaluated as being between 15 and 16.

Carbonization of the resin is carried out in air or in an inert atmosphere.

As this appears in FIG. 1, which represents a thermogram for processing by carbonization in air, the main portion of the reaction occurs between 200 and 500° C., the temperature gradient between 200 and 500° C. being set between 2 and 5° C./min. Beyond 500° C. and up to 1,000° C., the applied temperature gradient ranges from 5 to 10° C./min.

For the carbonization treatment in air, the measured mass loss between 20 and 1000° C. is of the order of 60%, which complies with the following reaction:

$$R_{52}U_9AmO_{18}H_{31} \rightarrow (U_3O_8)_3AmO_2$$

which by calculation gives 41% of residual mass after calcination.

Figure 2:
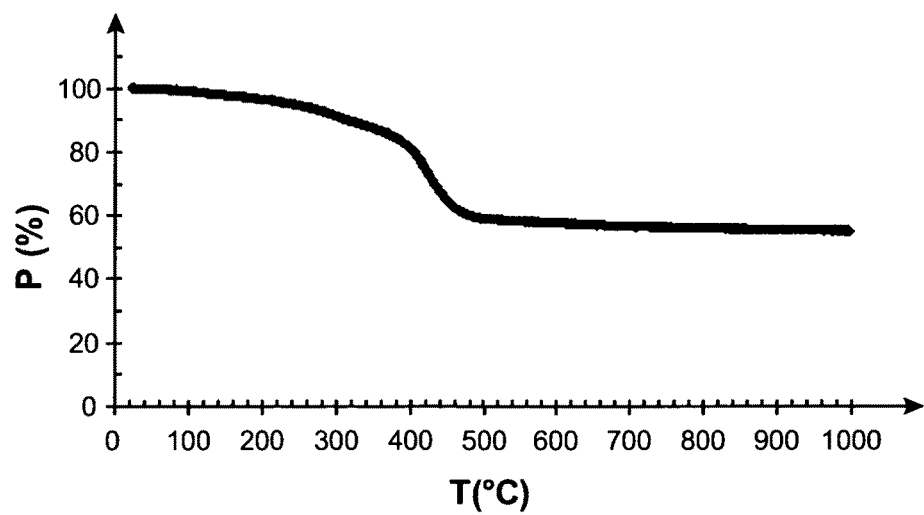

As regards the carbonization treatment under an inert atmosphere (in the case here, argon), it also appears, as illustrated on the thermogram of FIG. 2, that the essential part of the reaction occurs between 200 and 500° C., the temperature gradient between 200 and 500° C. being set to between 2 and 5° C./rain. Beyond 500° C. and up to 1000° C., the applied temperature gradient ranges from 5 to 10° C./min.

For this type of treatment, the mass loss measured between 20 and 1000° C. is close to 45%. It corresponds to the following reaction:

$$R_{52}U_9AmO_{18}H_{31} \rightarrow (UO_2)_2AmO_2nC$$

With the experimental mass loss, it is then possible to trace the amount of residual carbon and to calculate the C/metal ratio:n=9. This ratio may be optimized if the resin is further saturated by extending the contact time.

A slightly over-stoichiometric uranium dioxide phase with cubic structure is formed, associated with an americium dioxide phase.

Figure 3:
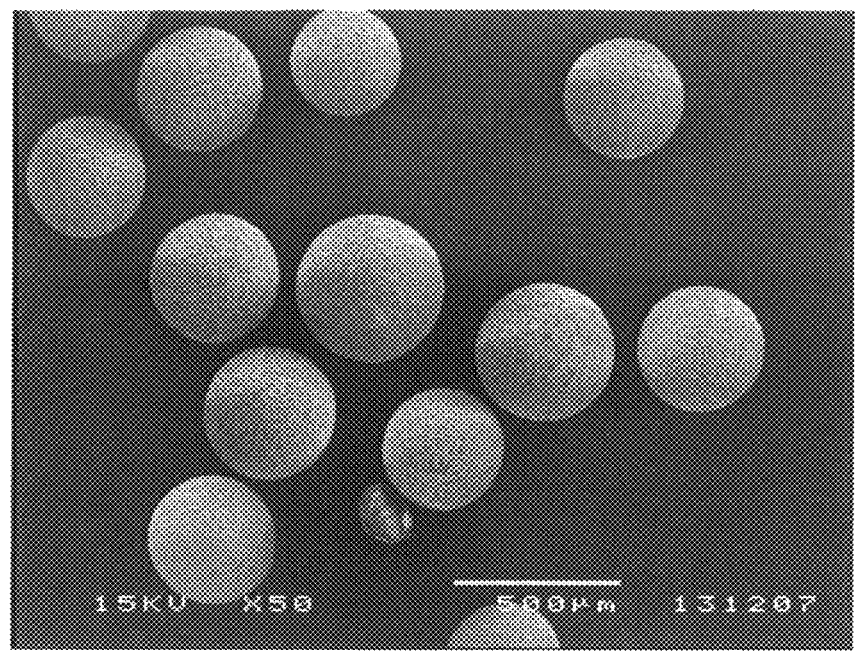

The morphology of the resin, initially spherical, is preserved all along the treatment. FIG. 3 illustrates a snapshot taken of the product after treatment at 900° C. under argon of the loaded resin. In this snapshot, microspheres of an intimate mixture of uranium dioxide, of americium dioxide taken in a carbonaceous matrix, may be observed. The mixture may be transformed into carbide or oxycarbide by heating at higher temperatures, or even in the presence of a reducing agent.

EXAMPLE 2

This example illustrates the preparation of a mixed oxide comprising both uranium and neodymium, this preparation comprises the following steps:
 preparation of a load solution comprising a hydroxylated uranyl nitrate and neodymium nitrate;
 passing this solution over a column comprising a cation exchange resin: a carboxylic resin IMAC HP333 of Rohm and Haas;
 heat treatment of the resin loaded with uranyl ions and neodymium ions.

a) Preparation of the Load Solution

The intention is to prepare a load solution comprising hydroxylated uranyl nitrate $UO_2(NO_3)_{1.0}(OH)_{1.0}$ and neodymium nitrate $Nd(NO_3)_3$.

To do this, one starts with 90 mL of a 0.05 mol/L neodymium nitrate aqueous solution and a 0.1 mol/L uranyl nitrate aqueous solution, in which 9 mmol of uranium oxide $UO_3$ are dissolved.

The number of moles of uranium oxide $n_{UO3}$ to be dissolved is evaluated by the following empirical formula:

$$n_{OU3}=[UO_2]_{initial}R'V$$

with $[UO_2]_{initial}$ corresponding to the initial concentration of uranyl nitrate, V being the volume and R' corresponding to the number of nitrates assigned to uranium, i.e. here 1, R' may be calculated in other terms, by the following formula:

$$R'=([NO_3^-]-3(Nd^{3+})/[UO_2^{2+}]$$

After adding an excess of $UO_3$ followed by filtration, a solution is thereby obtained comprising neodymium nitrate Nd(NO$_3$)$_3$ (0.05 mol/L) and a complex UO$_2$(NO$_3$)$_{1.0}$(OH)$_{1.0}$ (0.2 mol/L). The attained pH is 3.7.

b) Passage Over the Column

The selected resin is a cation exchange resin including exchangeable carboxylic groups: IMAC HP 333 manufactured by Rohm and Haas. This resin has a volume capacity of 4 mequiv./mL and exchange kinetics comparable with macroporous resins.

As the resin cannot be used as such, it is proceeded with grain size sorting and with extensive washing cycles.

The selected grain size is 800-1000 µm in this case.

The thereby treated resin is then dried and again sorted on a tilted table, so as to remove the broken or non-spherical particles.

Once this last sorting has been carried out, the particles of resins are humidified again with demineralized water and then introduced into a column in order to form a bed. The column is of the Bio-Rad brand and in glass with an inner diameter of 0.7 cm and a useful height of 10.5 cm. The height of the bed is about 8.5 cm.

The load solution prepared beforehand (volume of 100 mL) is then passed through the bed of resin particles at room temperature.

Figure 4:
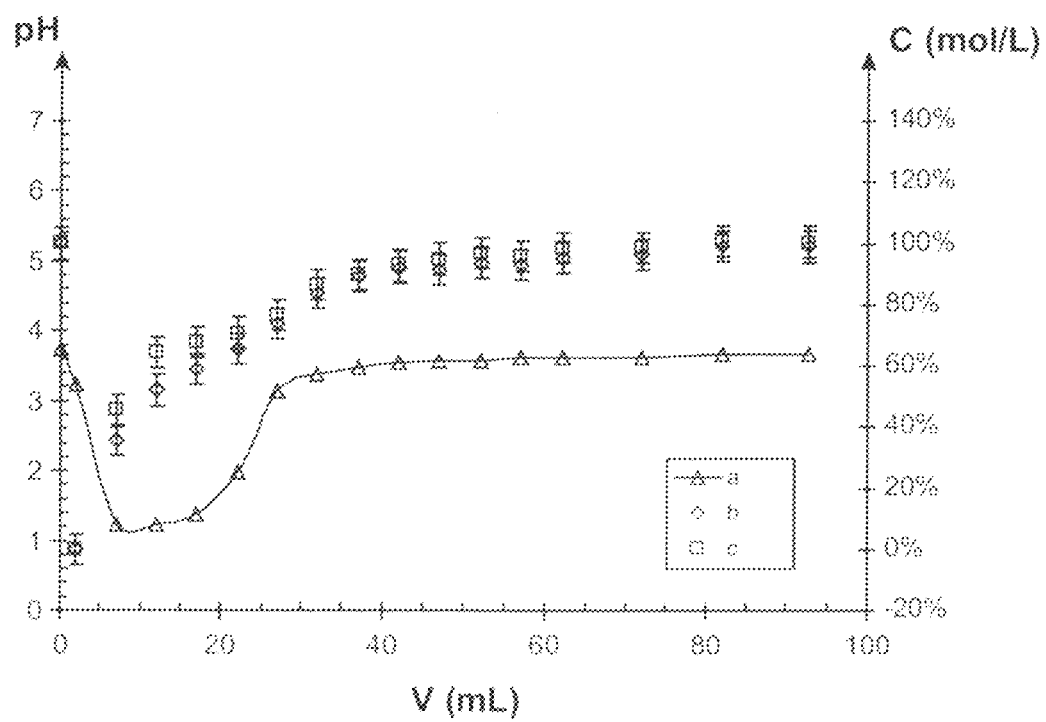

The carboxylic resin gradually exchanges its protons for uranyl and neodymium(III) ions as illustrated in FIG. 4. As this is apparent in this figure, the pH of the eluate suddenly decreases when the exchange begins with the resin.

It then gradually rises again until it again finds the pH value of the load solution upon entering the column after equivalence. The binding occurs congruently, since the uranium/neodymium (III) ratio does not change very much in the measured eluate at different intervals, the resin not exhibiting any selectivity for this pair of cations.

From the moment when the eluate becomes identical with the load, it may be considered that the exchange is completed and that the resin is again saturated with metal cations.

Next, the resin present in the column is washed with demineralized water in order to drive out the remaining load in the pores of the latter, dewatered and then dried in the oven at 105° C.

In this example, the load corresponds to a 80:20 atomic U/Nd mixture. The useful capacity of the resin then approaches 60% of the ion exchange capacity i.e. 7 mequiv./g of dry resin.

The summated equation of the ion exchange may then be reduced to:

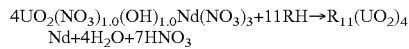
4UO$_2$(NO$_3$)$_{1.0}$(OH)$_{1.0}$Nd(NO$_3$)$_3$+11RH→R$_{11}$(UO$_2$)$_4$Nd+4H$_2$O+7HNO$_3$ RH representing the proton exchange resin.

The metal mass content in the loaded and dried resin is 37%, distributed as 33% for uranium and 4% for neodymium. The formulation of the resin may be approximately written as:

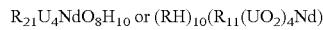
R$_{21}$U$_4$NdO$_8$H$_{10}$ or (RH)$_{10}$(R$_{11}$(UO$_2$)$_4$Nd)

which allows the C/(Nd$^+$ U) ratio to be evaluated as being 12.

C) Heat Treatment

Carbonization of the resin is carried out in air or under an inert atmosphere.

It appears that the essential part of the reaction occurs between 200 and 500° C., the temperature gradient between 200 and 500° C. being set to between 2 and 5° C./min. Beyond 500° C. and up to 1,000° C., the applied temperature gradient ranges from 5 to 10° C./min.

Figure 5:
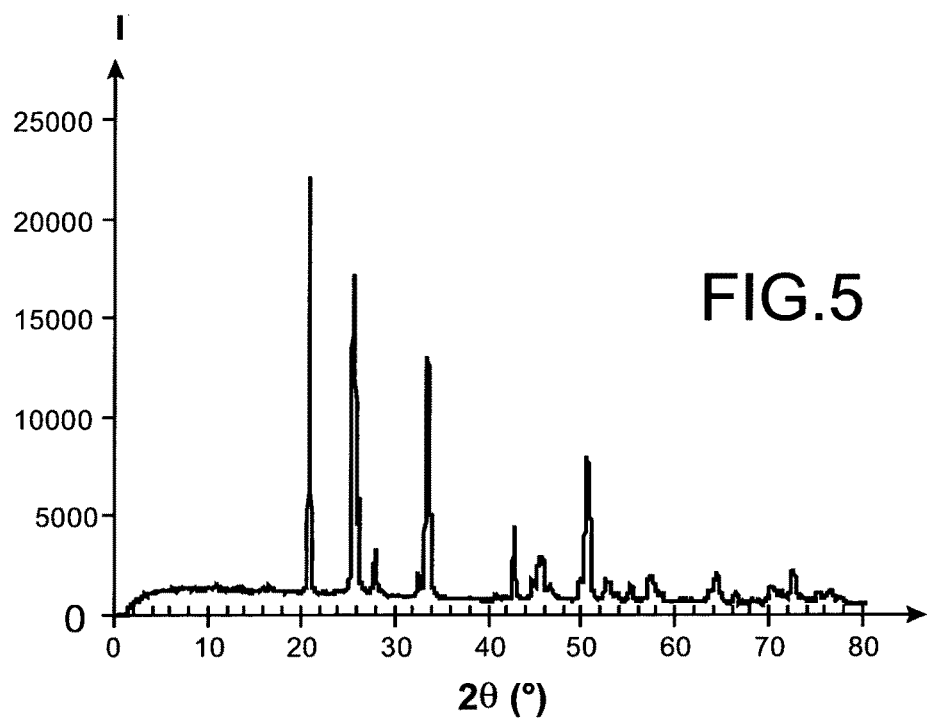
FIG. 5 shows a graph of the x-ray difractogramme type showing the intensity I versus the angle $2\theta$ (in °) for a fuel obtained by calcinations of a resin under air according to example 2.

For the carbonization treatment in air, the carbonization balance complies with the following reaction:

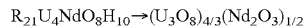
R$_{21}$U$_4$NdO$_8$H$_{10}$→(U$_3$O$_8$)$_{4/3}$(Nd$_2$O$_3$)$_{1/2}$ The carbonized form in air was studied by X-ray diffraction. As this appears in FIG. 5, the observed lines correspond to an uranium phase U$_3$O$_8$ mixed with an Nd$_2$O$_3$ phase with cubic structure. The U$_3$O$_8$ phase may be transformed into a UO$_2$ phase by a temperature treatment under a reducing atmosphere of H$_2$-argon.

Figure 6:
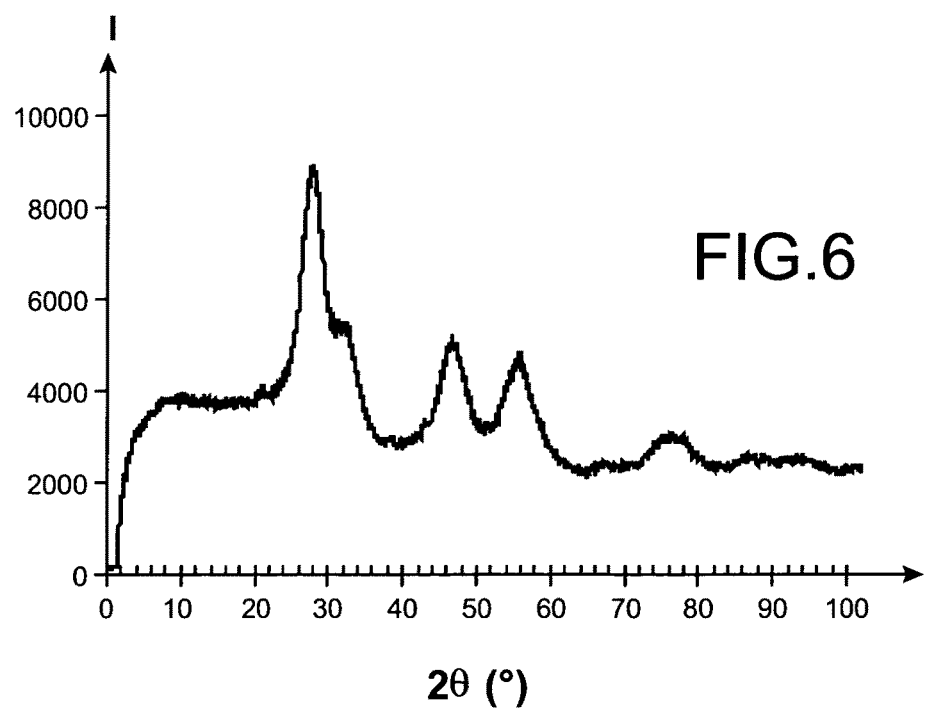
FIG. 6 illustrates a graph of the X-ray diffractogram type illustrating the intensity I versus the angle $2\theta$ (in °) for a fuel obtained by calcination of a resin under argon according to Example 2.

For the carbonization treatment under argon, a mixed slightly over-stoichiometric phase of uranium dioxide UO$_2$ with cubic structure and of neodymium sesquioxide Nd$_2$O$_3$ with the same cubic structure is formed, as attested by the diffractogram illustrated in FIG. 6 characteristic of a single cubic structure.

The morphology of the resin, initially spherical, is preserved all along the treatment.

Figure 7:
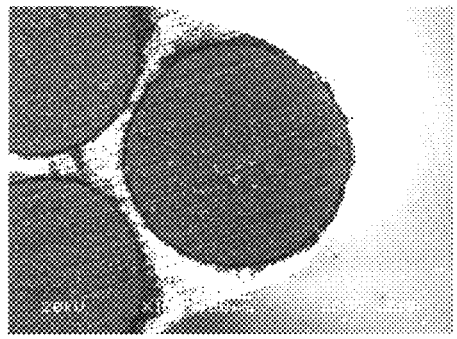
FIG. 7 illustrates different snapshots (a, b, c and d) of a mapping of an equatorial cut of a fuel microsphere obtained by carbonization of a resin under argon according to example 2.
Figure 7:
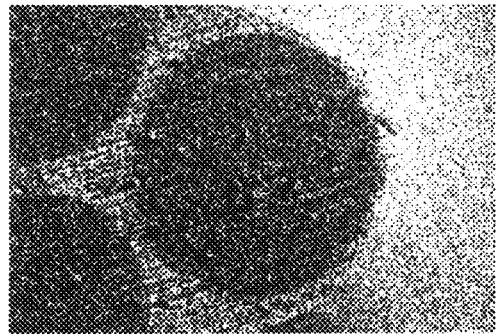
Figure 7:
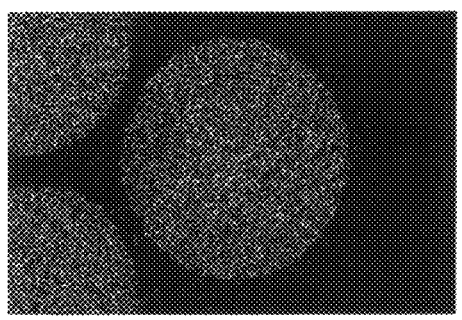
Figure 7:
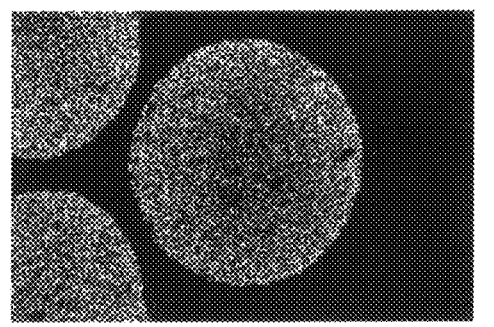

FIG. 7 illustrates various snapshots (a, b, c and d) of a mapping of an equatorial section of a fuel microsphere obtained by carbonization of a resin under argon in accordance with what is described below.

The snapshot «a» is an overall view of the section of the microsphere. The snapshots "b" "c" and "d" respectively illustrate the X-fluorescence microprobe analysis signal of the carbon, neodymium and uranium elements. Upon seeing the equality of the intensity of the fluorescence signal in the core of the microsphere, it may be inferred that the distribution of the metal cations in the carbon matrix is homogeneous.

The invention claimed is:

1. A method for preparing a nuclear fuel consisting of an oxide of uranium and at least one minor actinide selected from the group consisting of americium, curium, neptunium and mixtures thereof comprising the following steps:

preparing a nitric acid load solution comprising said at least one minor actinide in the form of a minor actinide nitrate with said minor actinide nitrate comprising a minor actinide cation and a nitrate anion and with said uranium being in the form of a complex of hydroxylated uranyl nitrate of formula UO$_2$(NO$_3$)$_{2-x}$(OH)$_x$ with x≤1;

passing said nitric acid load solution over a cation exchange resin comprising carboxylic groups —COOH, such that the complex of hydroxylated uranyl nitrate of said load solution causes concomitant ion exchange to occur between the uranyl cations of said complex and the minor actinide cations with protons of said carboxylic groups —COOH in the cation exchange resin whereby the uranyl cations and said minor actinide cations remain bound to the resin; and heat treating by carbonization of said cation exchange resin thus loaded whereby the nuclear fuel so obtained will consist of an oxide of uranium and at least one minor actinide selected from the group consisting of americium, curium, neptunium and mixtures thereof.

2. The method according to claim 1, wherein the minor actinide elements stem from a flow for reprocessing used fuel.

3. The method according to claim 1, wherein the step for preparing the load solution comprises:

preparation of a first nitric solution comprising nitrate of said minor actinide element;

introduction of a pre-determined amount of uranium oxide UO$_3$ or optionally U$_3$O$_8$, into said first solution, to form a hydroxylated uranyl nitrate complex of formula UO$_2$(NO$_3$)$_{2-x}$(OH)$_x$ with x≤1;

a step for mixing the resulting solution.

4. The method according to claim 1, wherein the step for preparing the load solution consists of introducing a predetermined amount of uranium trioxide into a first solution comprising nitrate of said minor actinide element and already uranyl nitrate, so as to form a hydroxylated uranyl nitrate complex of formula $UO_2(NO_3)_{2-x}(OH)_x$ with $x \leq 1$.

5. The method according to claim 3, wherein the predetermined amount of uranium trioxide to be introduced into the first solution is determined so that the molar ratio between the number of moles of nitrate ions and the number of moles of uranium is less than 2.

6. The method according to claim 1, wherein the resin is a resin resulting from (co)polymerization of (meth)acrylic acid or acrylonitrile with a cross-linking agent.

7. The method according to claim 1, wherein the resin, before the step for passing the load solution over it, undergoes one or more of the following steps:
- a wet calibration step, so as to isolate the desired grain size fraction;
- at least one washing step by applying a basic and acid treatment cycle with ammonia and nitric acid followed by a rinsing step with demineralized water;
- a drying step after the rinsing step;
- a shape-sorting step so as to remove broken or non-spherical particles.

8. The method according to claim 1, wherein the step for passing the load solution is carried out by percolation of the latter over the resin.

9. The method according to claim 1, wherein the step for passing the load solution over the resin is carried out until an eluate is obtained, having a concentration identical with that of the load solution.

10. The method according to claim 1, wherein the heat treatment step comprises a carbonization step at a temperature which may range up to 1000° C.

11. The method according to claim 10, wherein the heat treatment step comprises a step for reducing the material obtained after the carbonization step, so as to obtain a mixed carbide and/or oxycarbide comprising uranium and at least one minor actinide element selected from americurium, curium, neptunium and mixtures thereof.

12. A method for preparing a nuclear fuel consisting of an oxycarbide or a carbide of uranium and at least one minor actinide selected from the group consisting of americurium, curium, neptunium and mixtures thereof comprising the following steps:
- preparing a nitric acid load solution comprising said at least one minor actinide in the form of a minor actinide nitrate with said minor actinide nitrate comprising a minor actinide cation and a nitrate anion and with said uranium being in the form of a complex of hydroxylated uranyl nitrate of formula $UO_2(NO_3)_{2-x}(OH)_x$ with $x \leq 1$;
- passing said nitric acid load solution over a cation exchange resin comprising carboxylic groups —COOH, the complex of hydroxylated uranyl nitrate of said load solution causing concomitant ion exchange to occur between the uranyl cations of said complex and the minor actinide cations with protons of said carboxylic groups —COOH in the cation exchange resin, whereby the uranyl cations and said minor actinide cations remain bound to the resin;
- heat treating by carbonization of said cation exchange resin thus loaded whereby said nuclear-fuel is so obtained and reducing said oxide of uranium and at least one minor actinide whereby the nuclear fuel obtained consists of an oxycarbide or a carbide of uranium and at least one minor actinide selected from the group consisting of americurium, curium, neptunium and mixtures thereof.

* * * * *